(12) United States Patent
Anderson (10) Patent No.: US 11,097,710 B2
(45) Date of Patent: Aug. 24, 2021

(54) PURGE PROCEDURE FOR A DECOUPLED BRAKE SYSTEM AND BRAKE SYSTEM IMPLEMENTING THIS PROCEDURE

(71) Applicant: Robert Bosch GmbH, Stuttgart (DE)

(72) Inventor: Chris Anderson, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 16/728,616

(22) Filed: Dec. 27, 2019

(65) Prior Publication Data
US 2020/0216054 A1   Jul. 9, 2020

(30) Foreign Application Priority Data
Jan. 3, 2019   (FR) .................................. 1900031

(51) Int. Cl.
*B60T 17/22* (2006.01)
*B60T 11/30* (2006.01)
*B60T 8/32* (2006.01)
*B60T 13/16* (2006.01)

(52) U.S. Cl.
CPC ............. *B60T 17/222* (2013.01); *B60T 11/30* (2013.01); *B60T 8/326* (2013.01); *B60T 13/161* (2013.01); *B60T 2270/82* (2013.01)

(58) Field of Classification Search
CPC ............................... B60T 17/222; B60T 11/30

USPC ........................................................ 188/352
See application file for complete search history.

(56) References Cited

U.S. PATENT DOCUMENTS

| | | | |
|---|---|---|---|
| 2006/0192426 A1* | 8/2006 | Baechle | B60T 17/222 |
| | | | 303/119.1 |
| 2008/0238186 A1 | 10/2008 | Suzuki et al. | |
| 2013/0256071 A1 | 10/2013 | Jones et al. | |
| 2015/0001921 A1 | 1/2015 | Murayama et al. | |
| 2016/0039402 A1 | 2/2016 | Kamiya et al. | |
| 2018/0257630 A1* | 9/2018 | Kapanowski | B60T 7/042 |
| 2018/0297574 A1* | 10/2018 | Zimmermann | B60T 13/167 |
| 2020/0182262 A1* | 6/2020 | Blackwell | F15B 21/044 |

FOREIGN PATENT DOCUMENTS

| | | | | |
|---|---|---|---|---|
| DE | 3935353 A1 * | 4/1991 | | B60T 17/222 |
| FR | 2342420 A1 | 9/1977 | | |

* cited by examiner

*Primary Examiner* — Melanie Torres Williams
(74) *Attorney, Agent, or Firm* — Norton Rose Fulbright US LLP; Gerard Messina (57) ABSTRACT

A method (purge procedure) for purging a decoupled brake system including: a brake fluid reservoir, a master cylinder, a brake circuit connected to the wheel brakes, a pump equipped with a plunger. A segment of the brake circuit to be purged is isolated by closing the solenoid valves at the extremities of the segment, a vacuum is created with the plunger, and an extremity of this segment is placed in communication with the exterior to evacuate the trapped air bubble.

5 Claims, 4 Drawing Sheets

PURGE PROCEDURE FOR A DECOUPLED BRAKE SYSTEM AND BRAKE SYSTEM IMPLEMENTING THIS PROCEDURE

RELATED APPLICATION INFORMATION

The present application claims priority to and the benefit of French patent application no. 1900031, which was filed in France on Jan. 3, 2019, the disclosure of which is incorporated herein by reference.

FIELD OF THE INVENTION

The present invention concerns a procedure and a purge device for a decoupled brake system still called an electric brake system. The decoupled brake system comprises: a brake fluid reservoir, a master cylinder connected to the brake pedal, a brake circuit connecting the master cylinder to the wheel brakes, and a management unit to manage operation of the brake system by a program and based on the braking request resulting from actuation of the brake pedal.

BACKGROUND INFORMATION

Decoupled brake systems are seeing greater and greater development; they do not have a vacuum brake booster and control the phases of braking through actuation of the brake pedal, thereby pressurizing the brake circuit by a controlled actuator such as a pump.

An example of such a decoupled brake system has a plunger controlled by the brake system management unit, which generates the brake fluid pressure actuating the wheel brakes.

However, such decoupled brake systems or circuits are becoming increasingly complex due to the growing number of components such as solenoid valves, hydraulic pistons, and cavities. Additionally, because these brake systems are increasingly integrated and compact, in general, this results in an electro-hydraulic unit connected to different sensors such as the brake pedal actuator sensor, the pressure sensors throughout the circuit, information about vehicle and wheel movement that generates wheel brake control signals based on these parameters and the braking programs from the brake system's central management unit.

The electro-hydraulic unit or distribution unit that provides these different connections between the brake fluid reservoir and the wheel brakes is extremely complex in terms of its manufacture given that the channels are made by drilling into the unit.

At the time of installation of such a brake system in a vehicle, the various channels must be filled with brake fluid while preventing air pockets or air bubbles from developing in areas that are difficult to access. To accomplish this, the filling process consists in first creating a vacuum in the channel assembly and then injecting pressurized brake fluid into the evacuated channels.

But such an operation can only be carried out in a factory or specially equipped workshop.

Whenever the process must be carried out on the brake circuit either on site or in a workshop, it is difficult to ensure that the brake channels will be perfectly filled with brake fluid. Air bubbles can remain imprisoned in corners that brake fluid has difficulty accessing. But such air pockets result in operational defects or poor braking characteristics.

In short, these non-specialized arrangements do not provide a way to ensure the complete purging of the brake circuit.

SUMMARY OF THE INVENTION

An object of the present invention is an apparatus/arrangement for effectively and completely purging the brake circuit with a brake system apparatus/arrangement.

To that end, the object of the invention is a purging procedure of a decoupled brake system of the type described above, characterized in that we select a site likely to contain a gas pocket to be purged from the brake circuit, we define a channel segment having a first extremity and a second extremity, each equipped with a solenoid valve encompassing the site and a pressure/vacuum source with a solenoid valve intermediate between the site and the pressure/vacuum source, delimiting an outgoing subsegment; the second extremity beyond the corresponding solenoid valve being allowed to communicate with the outside atmosphere, the solenoid valves at the extremities are closed and the intermediate solenoid valve opened, thus creating a vacuum with the source in the isolated segment, this vacuum being maintained throughout a period dependent on the parameters of the isolated segment, then, the intermediate solenoid valve is closed to trap, beyond this intermediate solenoid valve, in the outgoing subsegment, the gas pocket or a gas bubble that has migrated beyond this intermediate solenoid valve; the solenoid valve at the second extremity of the channel segment is opened to open communication of the subsegment with the outlet, and pressure is applied by the pressure/vacuum source in the subsegment between the intermediate solenoid valve and the outlet to evacuate the gas bubble through the outlet. This purge procedure has the advantage of using an apparatus/arrangement existing in the brake system without requiring specific specialized equipment outside the motor and the brake circuits connected to the wheel brakes. It allows such a purge operation to be carried out independently of any external specialized equipment, the brake system control unit simply providing, on one hand, the closing and opening of the solenoid valves in sync with the depressurization and pressurization.

It is noted that the segment to be purged is defined by two extremities, one of which will be closed throughout the purge operation and the other of which will be closed then opened to apply the depressurization. Consequently, a blind segment belongs to this type of purge segment because the blind extremity is equivalent to an extremity closed by a solenoid valve; the other extremity of the blind segment, which is to say, the second extremity in the sense of the present invention, is thus that which is controlled by a solenoid valve in applying the steps of the procedure.

According to an advantageous characteristic, we select as outlet to the atmosphere the brake fluid reservoir or the bleeder screw of a wheel brake. In the first case, the outlet to the atmosphere through the brake fluid reservoir is controlled by the control unit, which opens the solenoid valves between one of the extremities of the purged segment and the brake fluid reservoir. In the other case, we intervene manually to open the bleeder screw of one of the wheel brakes, which may be the one closest to the purge point.

According to another advantageous characteristic, the source of the vacuum/pressure is the brake circuit pump whose plunger is controlled to create a vacuum, the plunger being maintained in the vacuum position throughout the vacuum stabilization period and at the end of the vacuum phase, one of the solenoid valves of the segment is opened to connect the segment to the outside atmosphere and the pump is directed so that its plunger applies pressure to the segment. The procedure using the brake circuit pump to create the vacuum is especially advantageous because it requires no intervention to the brake system other than in the brake circuit and this through the automatic control of the valves involved to ensure isolation of the segment, followed by the opening of one of these extremities to the outside atmosphere, and finally control of the pump plunger to create a vacuum movement and then a pressure movement. The specific nature of the pump equipping the brake circuit allows the vacuum phase and the pressure phase to be clearly separated through the simple translation of the plunger by the pump motor.

According to another advantageous characteristic, the vacuum/pressure source is the master cylinder whose piston is controlled to create a vacuum that is maintained throughout the stabilization period, and at the end of the vacuum phase an extremity of the isolated segment is opened to the outside atmosphere and the master cylinder directed to apply pressure to the segment.

This operation is performed by syncing actuation of the solenoid valves with the position of the brake pedal automatically using the signal supplied by the travel sensor of the primary piston of the tandem master cylinder.

According to another advantageous characteristic, the decoupled brake system comprises: a brake fluid reservoir, a master cylinder connected to the brake pedal by a thrust rod, a pedal travel sensor detecting the travel of the thrust rod, a brake circuit connecting the master cylinder to the wheel brakes, and a management unit to manage operation of the brake system based on the request for braking resulting from actuation of the brake pedal. This brake system according to the invention is characterized in that the management unit managing operation of the brake system contains a program to control implementation of the purge procedure as described above. This brake system has the advantage of not requiring any component other than those already existing in the brake system, the only addition being a control program for the solenoid valves and the pump and the master cylinder to activate these different components according to the steps of the program to be carried out.

As previously indicated, depending on the difficulty of the purge and the number of purge sites in the brake circuit, the cycle will be applied to each of the purge positions completely whether it entails a segment delimited by two solenoid valves or a blind segment delimited by a single solenoid valve. For each position, the purge cycle can also be repeated in case of difficulty.

The present invention is described below in greater detail by a brake circuit purge procedure according to the invention as shown in the attached drawings.

DETAILED DESCRIPTION

Figure 1:
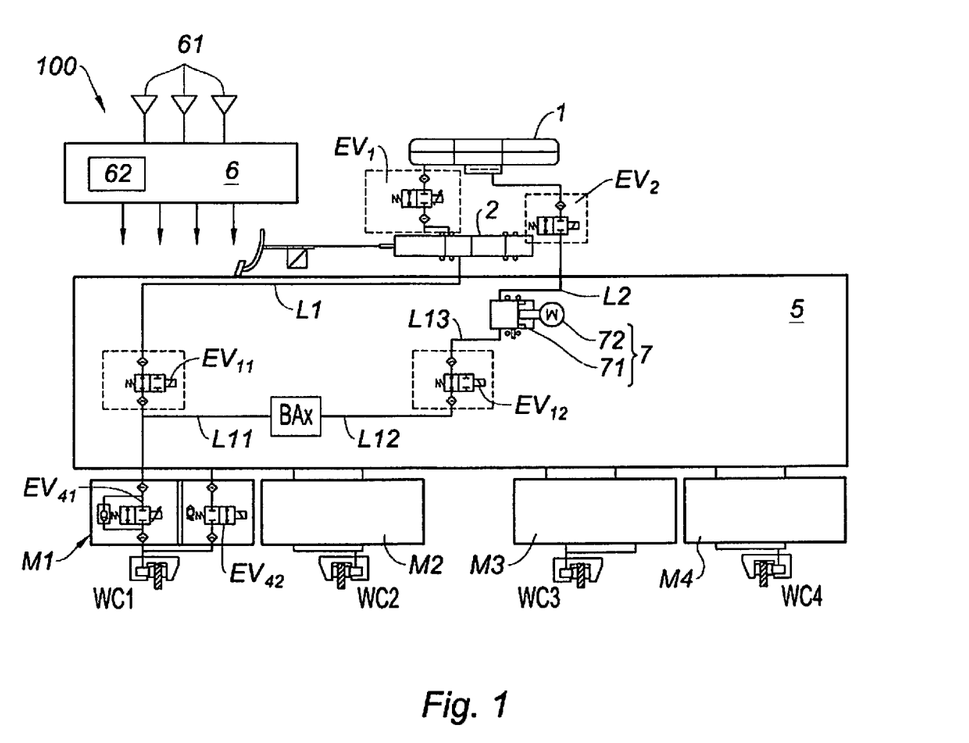
FIG. 1 is a simplified diagram of a brake system implementing the purge procedure according to the invention.

According to FIG. 1, the invention relates to a decoupled brake system 100 to which is applied the purge procedure according to the invention. Brake system 100 consists of brake fluid reservoir 1 connected to wheel brakes WC1-WC4 by tandem master cylinder 2 and brake circuit 5, which distributes the brake fluid among wheel brakes WC1-WC4 by brake fluid pressurization pump 7 and a set of solenoid valves.

Wheel brakes WC1-WC4 are each represented by a brake caliper on the brake disc associated with the wheel, not shown, and having a hydraulic actuator. Wheel brakes WC1-WC4 are connected to circuit 5 by inlet modules M1-M4, enabling each wheel brake WC1-WC4 to be cut with respect to circuit 5.

Tandem master cylinder 2 is decoupled from brake pedal 3; it acts on wheel brakes WC1-WC4 only in the event of a failure of brake circuit 5, to then supply brake fluid at the pressure generated by the force alone exerted on brake pedal 3.

During normal operation, tandem master cylinder 2 is decoupled from wheel brakes WC1-WC4 by a set of controlled solenoid valves. These solenoid valves are not shown in detail. Brake pedal 3 is then connected to a pedal feel simulator, not shown directly in the present invention.

Brake circuit 5 is controlled by control unit 6, which receives the brake request from brake pedal 3 in the form of the signal from travel sensor 31 associated with brake pedal 3.

Control unit 6 manages the pressure for braking operations by pump 7 and the controlled solenoid valves. Plunger 71 of the pump is activated by electric motor 72 controlled by control unit 6.

Brake circuit 5 connectors are channels or lines realized in a distribution block by a network of boreholes also accommodating the different components connected to wheel brakes WC1-WC4. The connection between circuit 5 and wheel brakes WC1-WC4 is made through identical modules M1-M4, of which only module M1 is shown in detail. This module M1 (like the others) consists of an incoming solenoid valve EV41 and an outgoing solenoid valve EV42. Solenoid valves EV41, EV42 are controlled by control unit 6 to adjust the pressure of the brake fluid feeding each wheel brake, such as wheel brake WC1, by the transmission or return of brake fluid. Only solenoid valve EV41 is connected to the channels of circuit 5 that must be purged; the presence of gas bubbles in the return channels between outgoing solenoid valve EV42 and brake fluid reservoir 1 has no influence on the characteristics of the braking operation.

Each wheel brake WC1-WC4 has a bleeder screw (not shown), putting, when it is open, the portion of the brake fluid channel passing through solenoid valve EV41 at the exterior atmosphere to purge that portion of the circuit.

Pump 7 is controlled by central unit 6 as a function of the braking requests translating actuation of brake pedal 3 and/or of signals supplied by sensors 61, representing the speed of the different wheels, the speed of the vehicle, the pressure of the different portions of brake circuit 5, and in wheel brakes WC1-WC4. The input signals are processed in central unit 6 by a braking program, such as the ESP program, to individually manage the brake fluid applied to each wheel brake WC1-WC4. The program automatically controls braking or in combination with the braking request corresponding to the actuation of brake pedal 3.

Central unit 6 has program 62 that applies the procedure according to the invention to generate control signals Sc applied to pump 7 and to the components of the circuit.

FIG. 1, tandem master cylinder 2 is connected to reservoir 1 by feed solenoid valve EV1 and to circuit 5 by channel L1. The outlet of chamber MCC1 of master cylinder 2 is connected to circuit 5; similarly, the other chamber MCC2 of master cylinder 2 is also connected to circuit 5 and to reservoir 1. The return of brake fluid from circuit 5 sent by pump 7 takes places through return solenoid valve EV2.

The details of circuit 5 necessary for the description of the procedure are limited to inlet channel L1, outlet channel L2, and pump 7 and the elements represented in FIG. 1.

Analysis of the operation of brake system 100 and knowledge of the geometry of the channels and components of brake circuit 5 enable determination of site(s) BAx in circuit 5 where a gas pocket (air pocket) might be found that has not been completely evacuated when purging brake system 100. This site BAx can be connected by channels to pump 7 and to the outside, that is, to the outlet through reservoir 1 or by a bleeder screw on one of the wheel brakes WC1-WC4. More generally, pump 7 is assimilated, according to the present invention, to a controlled source of pressure/vacuum. Even if pump 7 or the outlet are separated from site BAx by one or more solenoid valves (not shown), these solenoid valves will not be taken into account and will be left open or will be controlled to be open.

The solenoid valves and their position in brake system 100 are known and they are controlled by control unit 6 according to the brake program applied. But the solenoid valves can also be controlled individually outside the commands of the braking program to apply the procedure according to the invention.

Figure 2:
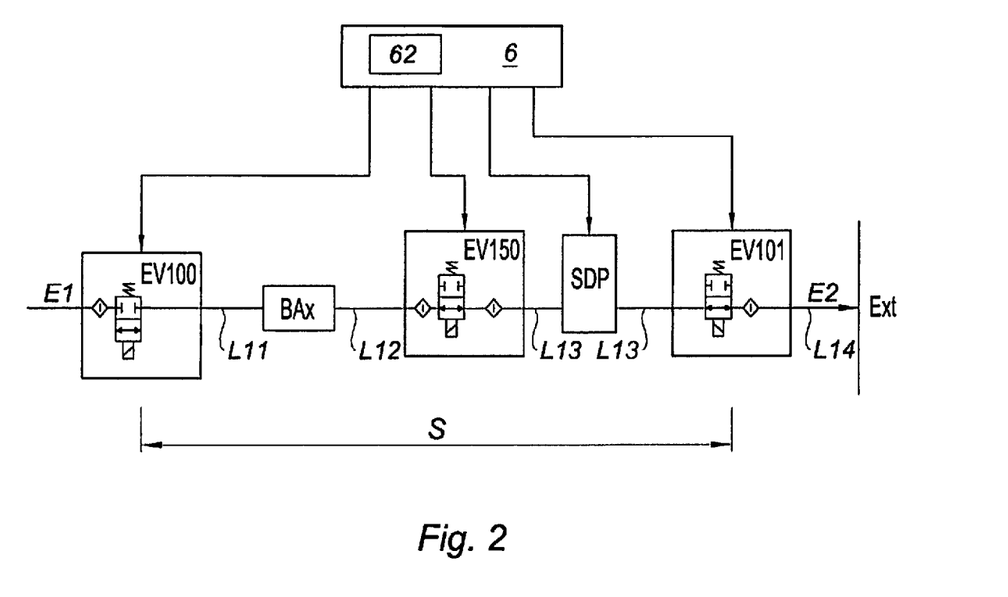
FIG. 2 is a general diagram of a segment of a channel to be purged.

With respect to the description of the procedure, FIG. 2 shows a general segment S, identified in brake circuit 5 for applying the purge procedure to the gas bubble (air or gas charged with brake fluid vapor), which is assumed to be found at site BAx.

Channel segment S is comprised between a first extremity E1 and a second extremity E2. Each extremity E1, E2 is occupied by a solenoid valve EV100, EV101. Solenoid valve EV101 is connected to the outlet to the atmosphere.

Segment S comprises site BAx and pressure/vacuum source SDP, with intermediate solenoid valve EV150 between site BAx and the pressure/vacuum source.

First solenoid valve EV100 is connected to site BAx by channel L11; site BAx is connected to intermediate solenoid valve EV150 by channel L12, and solenoid valve EV150 is connected to solenoid valve EV101 at extremity E2 by channel L13 in which is found source SDP.

The procedure according to the invention (FIG. 3) consists in choosing (ET1) a site BAx likely to contain a gas pocket to be purged from brake circuit 5.

Figure 3:
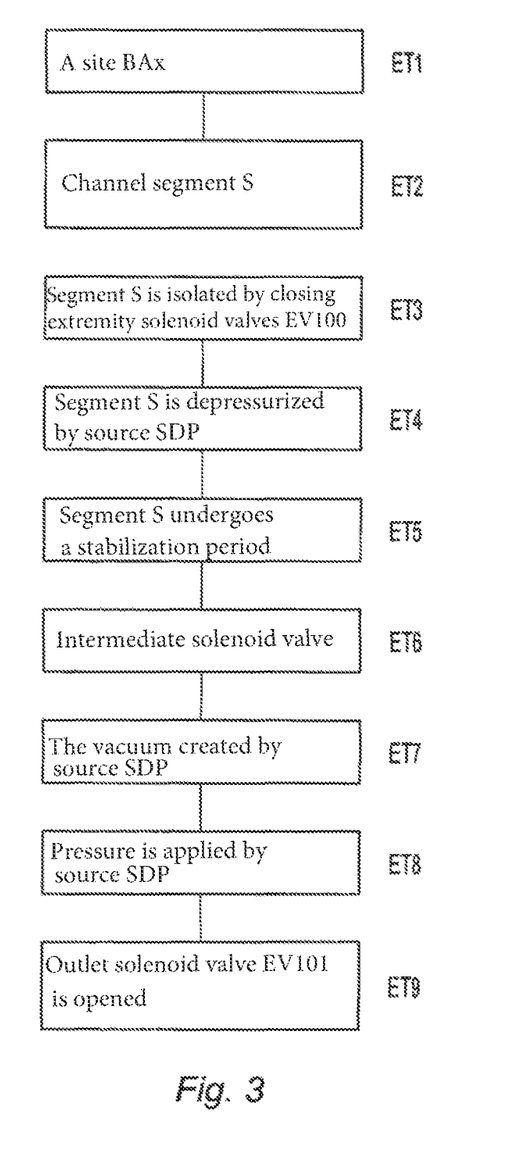
FIG. 3 shows the purge procedure diagram.

Around this site BAx, we define (ET2) channel segment S in circuit 5 having first extremity E1 and second extremity E2, each corresponding to a solenoid valve EV100, EV101. This segment comprises site BAx and pressure/vacuum source SDP, with intermediate solenoid valve EV150 between site BAx and source SDP. Intermediate solenoid valve EV150 and solenoid valve EV101 of the second extremity delimit channel segment L13, comprising source SDP.

In the case of a site BAx situated in a blind segment, the first extremity is closed by definition and only the second extremity with solenoid valve EV101 will be found, which will be controlled according to the general definition of the purge procedure of the invention.

Second extremity EV2 communicates with the outside atmosphere, that is, all the solenoid valves not shown that are found in channel L14 thus defined between this exit solenoid valve EV101 and the outside atmosphere are open.

Then, (ET3) of segment S is isolated by closing extremity solenoid valves EV100, EV101 and opening intermediate solenoid valve EV150.

During the following step ET4, segment S is depressurized by source SDP.

After depressurized segment S undergoes a stabilization period (ET5), intermediate solenoid valve EV150 is closed (ET6) to trap the gas bubbles that have arrived in outlet subsegment 13.

In the following step (ET7), the vacuum created by source SDP is eliminated and outlet solenoid valve EV101 is opened to evacuate the gas bubbles or gas pockets.

Pressure is applied (ET8) by source SDP in subsegment L13 to promote evacuation of the gas bubble through the outlet and outlet solenoid valve EV101 is opened (ET9).

The operation thus applied can be repeated if needed to completely purge site BAx.

The purge operation is repeated for all possible locations of unpurged gas pockets by defining a segment S on either side of site BAx and including a pressure/vacuum source SDP and intermediate solenoid valve EV150 between each site BAx and the pressure/vacuum source.

Figure 2A:
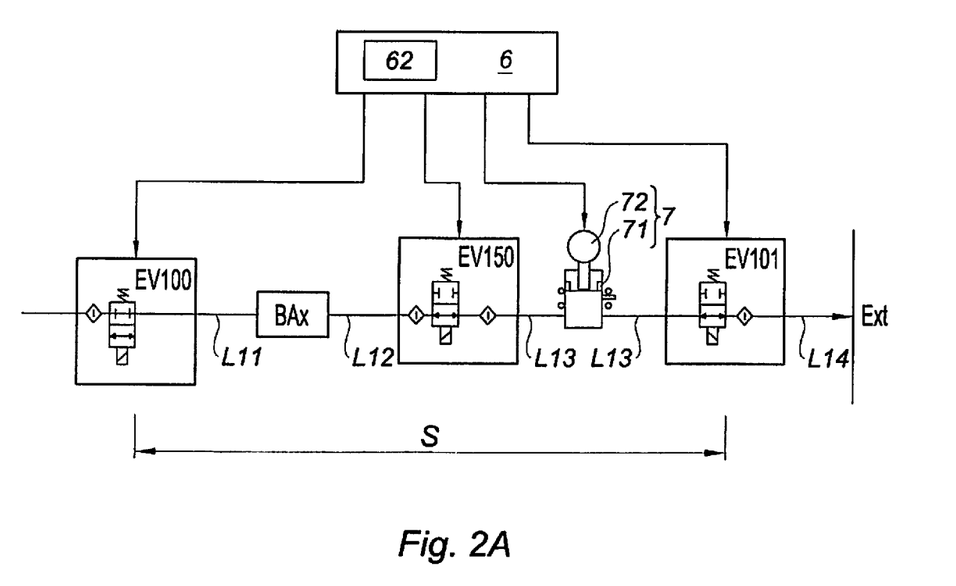
FIG. 2A is the diagram of FIG. 2 applied to a pressure/vacuum source consisting of the pump of hydraulic circuit 5.

FIG. 2A shows the general diagram in which source SDP is constituted by pump 7 of brake circuit 5.

The operating phases of pump 7 are controlled by the control unit to first create a vacuum in the segment then to eliminate the vacuum during closure of intermediate solenoid valve 150 and the opening of outlet solenoid valve EV101, then creating a pressure.

The vacuum is created by plunger 71, which withdraws into the pump, controlled by motor 72.

Pressurization takes place in the opposite direction.

The general procedure described above according to the invention applied to the embodiment of the diagram of FIG. 1 consists, according to the first step, in defining segment S of channels L11, L12, on either side of local site BAx, comprising pump 7, which is here pressure/vacuum source SDP, and an intermediate solenoid valve EV12, between site BAx and pump 7, delimiting outlet subsegment L13. Segment S, delimited at each extremity E1, E2 by a solenoid valve, is isolated from the other channels by closure of the solenoid valves at the two extremities of this segment:

solenoid valve EV11 and solenoid valve EV41 to isolate extremity E1 of channel L11;

solenoid valve EV2 to isolate channel L12 at extremity E2 beyond pump 7.

In this state of segment S, intermediate solenoid valve EV12 is open. Segment S thus defined is asymmetric because pump 7, alone, can only be represented on one side of site BAx. In this configuration, pump 7 is shown as being connected to the outlet by solenoid valve EV2, which constitutes one of the extremities of segment S, the other extremity being closed by solenoid valves EV11 and EV41 because channel L11 splits into two possible outlets, through channel L1 and to wheel brake WC1.

But due to the multiplicity of channels and solenoid valves in block 5, it would also be possible to connect outlet channel L2 of pump 7 to channel L1 or the channel connected to module M1 or to another module M2, M3, M4 to create another arrangement to the evacuation outlet with channel L13 and the intermediate solenoid valve such as solenoid valve EV12 between purge site BAx and the pressure/vacuum source (pump 7).

Segment S being isolated in leakproof manner, program 62 of unit 6 controls pump 7 so that its plunger 71 creates a vacuum in segment S. This vacuum arrives at site BAx and expands the gas pocket, which is detached from its position at least in part and passes, for example, through an area of reduced cross-section or a recessed portion. The gas pocket thus released, partially or entirely, can migrate to segment S and travel beyond open intermediate solenoid valve EV12.

The following step consists in closing intermediate solenoid valve EV12 to isolate at least a portion of the gas pocket on the pump 7 side in subsegment L13.

The third step of the procedure consists in eliminating the vacuum by releasing pump 7 or by also creating pressure with plunger 71 after opening outgoing solenoid valve EV2, connecting the outlet to brake fluid reservoir 1.

This pressure increase in subsegment L13 beyond intermediate solenoid valve EV12 and the opening of solenoid valve EV2 together with an impulse from pump 7 agitates the brake fluid in channel L13 and enables, with the opening of solenoid valve EV2 along with an impulse of pump 7, the evacuation of the air bubble through channel L12, the cavity of pump 7, outgoing solenoid valve EV2, and reservoir 1; this latter can, depending upon circumstances, accommodate the excess brake fluid resulting from the movement of the liquid displaced by pump 5.

It is worth emphasizing that pump 7 operates as a vacuum source only by executing a depressurization movement through displacement of its plunger 71 in the corresponding direction, driven by its motor 72. The same is true for the pressurization phase, during which plunger 71 only executes a compression movement by its displacement, actuated by motor 72.

In this mode of operation according to the procedure of the invention, pump 7 never operates continuously. The pump only operates synchronously with the operation of the solenoid valves delimiting segment S or portion L11, L13 of it.

The vacuum/pressure cycle can be repeated for the same site BAx, for example, depending on the size of the gas pocket.

As already indicated, if the purge needs to be repeated at a given point BAx, the operations always combine control of the movement of plunger 71 in the direction of depressurization or pressurization and control of the solenoid valves at the extremities of isolated segment S, then intermediate solenoid valve EV12 upstream of pump 7, then the opening of the solenoid valve connecting the extremity of segment S to the outlet beyond intermediate solenoid valve EV12 during the pressurization phase.

If this site, thus treated, is not the only one, the procedure will be repeated for each other site by defining a segment S comprising site BAx, pump 7, an intermediate solenoid valve, and two solenoid valves at each extremity of this segment S, and by repeating the above operations through its isolation, in communication with pump 7 and the opening of one of the extremities of segment S toward the outlet of brake circuit 5.

In the above example, reservoir 1 can be used when evacuating gas bubbles through the outlet of brake circuit 5, but the bleeder screw of a caliper of brake WC1-WC4 can also be used. The choice between these two solutions depends, for example, on the proximity of site BAx and the outlet.

To summarize, the simplified representation of the example described in FIG. 1, the multiplicity of solenoid valves of circuit 5 have not been shown and evacuation of the bubbles of the gas pocket has been described only in the case when solenoid valve EV2 is opened beyond pump 7, due to the bubble trapped in segment L13.

But this egress can also be made through channels and solenoid valves that are not shown, downstream of pump 7 and connecting a module of wheel brake M1-M4 or channel L1 for the purge.

The particularity of the representation arises from the fact that circuit 5 has only one pump 7, which is shown on a side of site BAx but which could just as well have been situated on the other side in channel L11 or a separation solenoid valve such as EV12.

This asymmetry of representation implies that the extremity of channel L11 is always closed during the procedure.

In the case of release through brake fluid reservoir 1, solenoid valve EV41 remains closed and the release occurs by connecting channel L2 to channel L1.

In the case of release through the bleeder screw of wheel brake WC1 (or another wheel brake), outlet solenoid valve EV2 and solenoid valve EV11 remain closed and solenoid valve EV41 of the brake purge will be opened while remaining connected to channel L2.

The procedure according to the invention can also be applied with master cylinder 2 operating as a vacuum/pressure source.

In this example of the procedure for a gas pocket located at point BAx, the depressurization step takes place as follows:

we isolate segment S, comprising point BAx and the pressure/vacuum source, that is, master cylinder 2 and the intermediate solenoid valve, which is, in this case, solenoid valve EV11, segment S consisting of channels L12, L11, L1;

segment S is comprised between solenoid valve EV1 beyond master cylinder 2 and solenoid valve EV12 beyond point BAx, solenoid valves EV1, EV41, and EV12 are closed;

the intermediate solenoid valve in segment S, that is, solenoid valve EV11, is opened.

Pump 7 and solenoid valve EV2 are not involved.

Here, too, the purge cycle is controlled by control unit 6, which activates the piston of master cylinder 2 and creates a vacuum in channels L1, L11, which arrives at point BAx and downstream in channel L12.

The vacuum created by the displacement of brake fluid to master cylinder 2 causes the gas pocket to swell, and the increased volume results in its release or breakdown; from this moment on a bubble thus freed can move according to the characteristics of channels L1, L11, L12 and travel beyond intermediate solenoid valve EV11.

Solenoid valve EV11 is then closed to retain the bubble in channel L1, then, during a third step, master cylinder 2 is directed to compress the brake fluid and evacuate the gas bubble through tandem master cylinder 2 and reservoir 1.

The opening of segment S toward the outlet and the effectiveness of evacuating the gas bubble may depend on the ease, in fluidic terms, presented by either path to the outlet, which is to say brake fluid reservoir 1 or the bleeder screw. It can be useful to follow the first vacuum/pressure cycle, involving opening of one of the reservoir 1/bleeder screw outlets, with another cycle, involving the opening to the other bleeder screw/reservoir 1 outlet.

The procedure, in its versions described above, is applied after a preparatory phase that, in theory, is carried out only once and is reflected in program 62 and identification data about purge sites BAx.

During this preparatory phase, based on the geometric and, more generally, the physical characteristics of the network of channels and the components of brake circuit 5, we determine sites BAx where a gas bubble (air bubble or degassing bubble) might reside and reduce the effectiveness of brake system 100.

The effectiveness of system 100 is globally detected by analysis of the response of the system to a braking request. If circuit 5 is not adequately purged, this is reflected in a response curve that differs from the theoretical curve to be obtained. From experience, the differences due to purge defects have very specific and recognizable characteristics.

Knowing that there is a purge defect and knowing the structure of brake circuit 5, it is possible to identify the most likely points BAx for the location of a gas bubble.

This preliminary location analysis is common to a given type of brake system 100. The identification of channels and components, especially the solenoid valves, is characteristic of brake system 100.

Implementation of the purge procedure on a brake system 100 that has been insufficiently purged takes place on the basis of these general data.

REFERENCE KEY

| | |
|---|---|
| 100 | Decoupled brake system |
| 1 | Brake fluid reservoir |
| 2 | Master cylinder/tandem master cylinder |
| 3 | Brake pedal |
| 31 | Brake pedal travel sensor |
| 4 | Thrust rod connecting the pedal to the master cylinder |
| 5 | Brake circuit |
| 6 | Central control unit |
| 61 | Sensors |
| 62 | Program |
| 7 | Pump; pressure/vacuum source |
| 71 | Plunger |
| 71 | Motor |
| BAx | Presumed site of air bubble |
| EV1 | Feed solenoid valve |
| EV2 | Return solenoid valve |
| EV41 | Wheel brake inlet solenoid valve |
| EV42 | Wheel brake outlet solenoid valve |
| EV101 | Extremity solenoid valve |
| EV102 | Extremity solenoid valve |
| EV150 | Intermediate solenoid valve |
| L1, L11, L12 | Channels |
| L13 | Channel subsegment |
| EV11 | Brake circuit 5 solenoid valve |
| EV12 | Brake circuit 5 solenoid valve |
| M1, M2, M3, M4 | Wheel brake modules |
| MCC1 | Primary chamber of master cylinder |
| MCC2 | Secondary chamber of master cylinder |
| S | Isolated channel segment |
| E1 | First extremity of segment S |
| E2 | Second extremity of segment S |
| WC1-WC4 | Wheel brakes |
| Δt | Period of application of vacuum |
| ET 1-ET6 | Steps of the procedure |

The invention claimed is:

1. A method for purging a decoupled brake system, the method comprising:
   selecting a site likely to contain a gas pocket to be purged from a brake circuit, wherein the brake system includes a brake fluid reservoir, a master cylinder connected to the brake pedal by a thrust rod, a pedal travel sensor to detect thrust rod travel, the brake circuit connecting the master cylinder to the wheel brakes, and a management unit to manage operation of the brake system as a function of a braking request made by actuation of the brake pedal;
   defining a channel segment having a first extremity and a second extremity, each equipped with a solenoid valve including the site and a source of pressure or vacuum with an intermediate solenoid valve between the site and the pressure or vacuum source;
   delimiting an outgoing subsegment, wherein the second extremity beyond the corresponding solenoid valve is configured to communicate with the outside atmosphere;
   closing the extremity solenoid valves and allowing the intermediate solenoid valve to remain open;
   creating a vacuum with the source in the segment thus isolated and maintaining the vacuum throughout a period of time, depending on the parameters of the isolated segment;
   closing the intermediate solenoid valve to trap, beyond this intermediate solenoid valve, in the outgoing subsegment, the gas pocket or gas bubble that has migrated beyond this intermediate solenoid valve;
   opening the solenoid valve at the second extremity of the channel segment to open communication of the subsegment toward the outlet; and
   applying pressure from the pressure or vacuum source to the subsegment between the intermediate solenoid valve and the outlet to evacuate the gas bubble through the outlet.

2. The method of claim 1, wherein the outlet to the atmosphere is the brake fluid reservoir or the bleeder screw of a wheel brake.

3. The method of claim 1, wherein the vacuum or pressure source is the pump of the brake circuit whose plunger is controlled to create the vacuum, and wherein the plunger is maintained in the vacuum position throughout the stabilization period and, at the end of the vacuum phase and after closure of the intermediate solenoid valve, the second solenoid valve is opened to connect the subsegment downstream of the intermediate solenoid valve to the atmosphere, and wherein the pump is controlled so that the plunger applies pressure to this subsegment.

4. The method of claim 1, wherein the vacuum or pressure source is the master cylinder whose piston is controlled to create a vacuum through an action on the brake pedal, wherein the master cylinder is maintained in the vacuum position throughout the period, wherein at the end of the vacuum phase and after closure of the intermediate solenoid valve, the second solenoid valve is opened to connect the subsegment downstream of the intermediate solenoid valve to the atmosphere, wherein the master cylinder is controlled with the brake pedal so it applies pressure in this subsegment, wherein the activation of the solenoid valves is synchronized with the position of the brake pedal automatically with the help of the signal from the travel sensor of the primary piston of the tandem master cylinder.

5. A decoupled brake system, comprising:
   a brake fluid reservoir;
   a master cylinder connected to the brake pedal by a thrust rod;
   a pedal travel sensor to detect a travel of the thrust rod;
   a brake circuit to connect the master cylinder to the wheel brakes; and
   a management unit to manage operation of the brake system as a function of the brake request through actuation of the brake pedal;
   wherein the management unit has a program for purging the decoupled brake system, by performing the following:
      selecting a site likely to contain a gas pocket to be purged from a brake circuit, wherein the brake system includes the brake fluid reservoir, the master cylinder connected to the brake pedal by the thrust rod, the pedal travel sensor to detect the thrust rod travel, the brake circuit connecting the master cylinder to the wheel brakes, and the management unit to manage operation of the brake system as a function of the braking request made by actuation of the brake pedal;

defining a channel segment having a first extremity and a second extremity, each equipped with a solenoid valve including the site and a source of pressure or vacuum with an intermediate solenoid valve between the site and the pressure or vacuum source;

delimiting an outgoing subsegment, wherein the second extremity beyond the corresponding solenoid valve is configured to communicate with the outside atmosphere;

closing the extremity solenoid valves and allowing the intermediate solenoid valve to remain open;

creating a vacuum with the source in the segment thus isolated and maintaining the vacuum throughout a period of time, depending on the parameters of the isolated segment;

closing the intermediate solenoid valve to trap, beyond this intermediate solenoid valve, in the outgoing subsegment, the gas pocket or gas bubble that has migrated beyond this intermediate solenoid valve;

opening the solenoid valve at the second extremity of the channel segment to open communication of the subsegment toward the outlet; and applying pressure from the pressure or vacuum source to the subsegment between the intermediate solenoid valve and the outlet to evacuate the gas bubble through the outlet.

* * * * *